(12) United States Patent
De Rossi et al.

(10) Patent No.: US 10,656,439 B2
(45) Date of Patent: May 19, 2020

(54) LENSES WITH IMPROVED MANAGEMENT OF DISTORTION

(71) Applicant: Essilor International, Charenton-le-Pont (FR)

(72) Inventors: Helene De Rossi, Charenton-le-Pont (FR); Fabien Muradore, Charenton-le-Pont (FR)

(73) Assignee: Essilor International, Charenton-Le-Pont (FR)

( * ) Notice: Subject to any disclaimer, the term of this patent is extended or adjusted under 35 U.S.C. 154(b) by 78 days.

(21) Appl. No.: 15/774,746

(22) PCT Filed: Nov. 9, 2016

(86) PCT No.: PCT/EP2016/077094
§ 371 (c)(1),
(2) Date: May 9, 2018

(87) PCT Pub. No.: WO2017/081065
PCT Pub. Date: May 18, 2017

(65) Prior Publication Data
US 2018/0321509 A1    Nov. 8, 2018

(30) Foreign Application Priority Data

Nov. 13, 2015  (EP) ..................... 15306806

(51) Int. Cl.
*G02C 7/06*     (2006.01)
*G02C 7/02*     (2006.01)

(52) U.S. Cl.
CPC ............... *G02C 7/068* (2013.01); *G02C 7/02* (2013.01); *G02C 7/066* (2013.01); *G02C 2202/22* (2013.01)

(58) Field of Classification Search
CPC .......... G02C 7/02; G02C 7/066; G02C 7/068; G02C 7/024; G02C 7/028; G02C 7/06; G02C 7/061; G02C 7/063; G02C 2202/22
See application file for complete search history.

(56) References Cited

U.S. PATENT DOCUMENTS

| 6,454,408 B1 | 9/2002 | Morris et al. |
|---|---|---|
| 2003/0086055 A1 | 5/2003 | Morris et al. |
| 2003/0174278 A1 | 9/2003 | Esser et al. |
| 2007/0182923 A1* | 8/2007 | Kitani .................... G02C 7/028 351/159.42 |

(Continued)

FOREIGN PATENT DOCUMENTS

| EP | 1 031 063 A1 | 8/2000 |
|---|---|---|
| EP | 2 095 174 A1 | 9/2009 |

(Continued)

OTHER PUBLICATIONS

International Search Report dated Feb. 15, 2017 in PCT/EP2016/077094 filed Nov. 9, 2016.

(Continued)

*Primary Examiner* — Jordan M Schwartz
(74) *Attorney, Agent, or Firm* — Oblon, McClelland, Maier & Neustadt, L.L.P.

(57) ABSTRACT

Ophthalmic lenses intended to be worn by non-presbyopic wearers, such as single-vision ophthalmic lenses. The lenses exhibit reduced distortion as perceived by the wearer.

8 Claims, 7 Drawing Sheets

(56) References Cited

U.S. PATENT DOCUMENTS

| | | | |
|---|---|---|---|
| 2009/0257026 A1* | 10/2009 | Varnas | G02C 7/063 |
| | | | 351/159.5 |
| 2010/0060852 A1 | 3/2010 | Merritt et al. | |
| 2011/0187993 A1 | 8/2011 | Alonso Fernández et al. | |
| 2015/0055083 A1* | 2/2015 | Mori | G02C 7/068 |
| | | | 351/159.42 |

FOREIGN PATENT DOCUMENTS

| WO | WO 01/44859 A2 | 6/2001 |
|---|---|---|
| WO | WO 2011/093929 A1 | 8/2011 |

OTHER PUBLICATIONS

"Ophthalmic optics—Spectacle lenses—Vocabulary", International Standard ISO 13666, Reference No. ISO 13666:2012(E/F/R), 2012, 178 total pages (with English translation).

"Ophthalmic optics—Uncut finished—spectacle lenses—Part 2: Specifications for progressive power lenses", International Standard ISO 8980-2, Second edition, Reference No. ISO 8980-2:2004(E), Feb. 1, 2004, 14 total pages.

"Ophthalmic optics—Mounted spectacle lenses", International Standard ISO 21987, First edition, Reference No. ISO 21987:2009(E), Oct. 1, 2009, 22 total pages.

* cited by examiner

LENSES WITH IMPROVED MANAGEMENT OF DISTORTION

FIELD OF THE INVENTION

The invention relates to ophthalmic lenses intended to be worn by non-presbyopic wearer, such as single-vision ophthalmic lenses. Such lenses, including single-vision ophthalmic lenses generally exhibit spatial variations of optical power. This means that the optical power is not strictly uniform over the entire lens, thus resulting in power defects. Such power defects can be either positive or negative, and lead to distortion, namely magnification defects. Such defects distort the visual perception by the wearer.

SUMMARY OF THE INVENTION

The invention relates to ophthalmic lenses intended to be worn by non-presbyopic wearers, such as single-vision ophthalmic lenses. The lenses of the invention exhibit reduced distortion as perceived by the wearer.

The present invention advantageously provides lenses that meet the wearer's prescription (the ametropia is corrected), and in addition provides for a better visual experience, since magnification defects are reduced and the wearer's perceived vision is more accurate, in particular for peripheral vision.

For a given ophthalmic lens, irrespective of its conception or nature, the lens exhibits variations of optical power, which in turn results in variations of values of magnification, which creates distortion. For example, for a single-vision lens, the lens exhibits increased power defects at the periphery. The defects may be either positive or negative in value. The variation of optical power between the center of the lens and its rim creates a variation in magnification that creates distortion.

The present invention proposes to 'manage' curvature values for the front surface of the lens, as a function of optical power variations. In some aspects, the present invention proposes to 'flatten' the front-surface of the lens in the regions of higher (increased) optical values.

Thus, in general terms, the invention relies on a contra-intuitive technical solution, wherein selection of certain curvatures values for the lens result in reduced distortion, and hence improved visual comfort for the wearer.

DEFINITIONS AND DETAILED DESCRIPTION OF THE INVENTION

The following definitions are provided to describe the present invention.

Distortion refers to a form of optical aberration. It is a deviation from rectilinear projection (i.e. a projection in which straight lines in a scene remain straight in an image). Distortion includes radial distortion, such as barrel distortion or pincushion distortion. Distortion also includes mustache distortion or complex distortion, namely a mixture of barrel and pincushion distortions.

Magnification refers to enlargement.

A surface may be defined as a set of a plurality of points; and/or it may be defined with one or more equations or mathematical relations between point coordinates; and/or it may be defined by a plurality of data (providing coordinates).

A mean curvature value may be defined as an average value over a given part of a surface; and/or as a mean curvature value over a set of points over a given surface.

An object point M at an object distance is considered for a gaze direction $(\alpha,\beta)$. An object proximity ProxO is defined for the point M on the corresponding light ray in the object space as the inverse of the distance MJ between point M and point J of the vertex sphere:

$$ProxO = 1/MJ$$

This enables to calculate the object proximity within a thin lens approximation for all points of the vertex sphere, which may is used for the determination of an ergorama. For a real lens, the object proximity can be considered as the inverse of the distance between the object point and the front surface of the lens, on the corresponding light ray.

For the same gaze direction $(\alpha,\beta)$, the image of a point M having a given object proximity is formed between two points S and T which correspond respectively to minimal and maximal focal distances (which would be sagittal and tangential focal distances). The quantity Prox I is called image proximity of the point M:

$$ProxI = \frac{1}{2}\left(\frac{1}{JT} + \frac{1}{JS}\right)$$

The optical power is also called refractive power

By analogy with the case of a thin lens, it can therefore be defined, for a given gaze direction and for a given object proximity, i.e. for a point of the object space on the corresponding light ray, an optical power Pui as the sum of the image proximity and the object proximity.

$$Pui = ProxO + ProxI$$

With the same notations, an astigmatism Ast is defined for every gaze direction and for a given object proximity as:

$$Ast = \left|\frac{1}{JT} - \frac{1}{JS}\right|$$

This definition corresponds to the astigmatism of a ray beam created by the lens.

Figure 3:
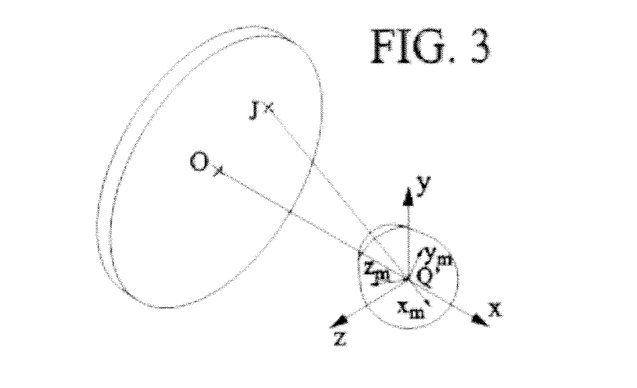

FIG. 3 represents a perspective view of a configuration wherein the parameters $\alpha$ and $\beta$ are non-zero. The effect of rotation of the eye can thus be illustrated by showing a fixed frame $\{x, y, z\}$ and a frame $\{x_m, y_m, z_m\}$ linked to the eye. Frame $\{x, y, z\}$ has its origin at the point Q'. The axis x is the axis Q'O and it is orientated from the lens towards the eye. The y axis is vertical and orientated upwardly. The z axis is such that the frame $\{x, y, z\}$ is orthonormal and direct. The frame $\{x_m, y_m, z_m\}$ is linked to the eye and its center is the point Q'. The $x_m$ axis corresponds to the gaze direction JQ'. Thus, for a primary gaze direction, the two frames $\{x, y, z\}$ and $\{x_m, y_m, z_m\}$ are the same. It is known that the properties for a lens may be expressed in several different ways and notably in surface and optically. A surface characterization is thus equivalent to an optical characterization. In the case of a blank, only a surface characterization may be used. It has to be understood that an optical characterization requires that the lens has been machined to the wearer's prescription. In contrast, in the case of an ophthalmic lens, the characterization may be of a surface or optical kind, both characterizations enabling to describe the same object from two different points of view. The value in surface terms can be expressed with relation to points.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or before the eye rotation center Q' of the eye for a primary gaze direction. The primary gaze direction corresponds to the situation where a wearer is looking straight ahead. In the chosen frame, the fitting cross corresponds thus to a lowering angle α of 0° and an azimuth angle β of 0° whatever surface of the lens the fitting cross is positioned rear surface or front surface.

Figure 1:
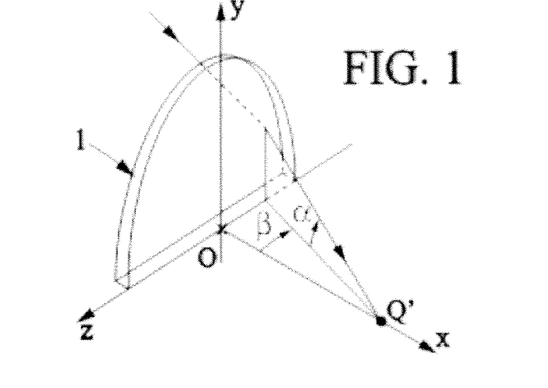
FIGS. 1-3 show, diagrammatically, optical systems of eye and lens and ray tracing from the center of rotation of the eye.
Figure 2:
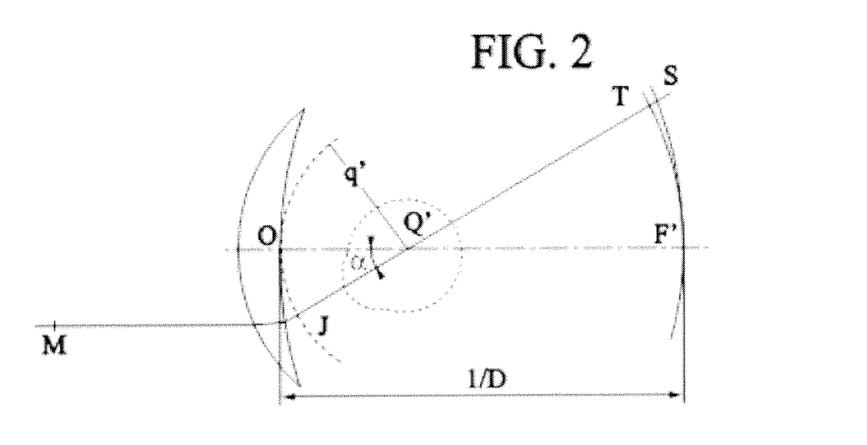

The above description made with reference to FIGS. 1-3 was given for central vision. In peripheral vision, as the gaze direction is fixed, the center of the pupil is considered instead of center of rotation of the eye and peripheral ray directions are considered instead of gaze directions. When peripheral vision is considered, angle α and angle β correspond to ray directions instead of gaze directions.

The present invention relates to an ophthalmic lens (L) intended for correcting a wearer's eye vision in compliance with a desired value of optical power and/or a desired value of astigmatism, wherein said wearer's eye is non presbyopic, wherein the ophthalmic lens (L) comprises:
an eye-side surface (RS) being positioned closest to the wearer's eye when the ophthalmic lens (L) is worn by the wearer in given wearing conditions;
an object-side surface (FS) being positioned opposite to said eye-side surface (RS) in said wearing conditions;
wherein the ophthalmic lens (L) comprises:
a first optical portion (OP1) having in said wearing conditions a first optical power P1;
a second optical portion (OP2) having in said wearing conditions a second optical power P2;
wherein:
the first optical portion (OP1) corresponds in said wearing conditions to a first zone (Z1) of the object-side surface (FS), wherein said first zone (Z1) has a mean curvature value MCURV1;
the second optical portion (OP2) corresponds in said wearing conditions to a second zone (Z2) of the object-side surface (FS), wherein said second zone (Z2) has a mean curvature value MCURV2;
wherein P1<P2 and MCURV2<MCURV1.

In some embodiments, the ophthalmic lens provides at least a first effective portion of stabilized optical power wherein the value of optical power does not deviate by more than +/−0.120 diopters from the value of desired optical power and wherein said first effective portion corresponds in said wearing conditions to an area of the object-side surface (FS), wherein said first area comprises a disk of at least 6 mm diameter.

In some embodiments, said first zone (Z1) and said second zone (Z2) have a different contour.

In some embodiments, the object side surface (FS) of the lens is aspherical. In some embodiments, the object side surface (FS) of the lens is not rotationally symmetrical.

In some embodiments, the eye-side surface (RS) of the lens is not rotationally symmetrical.

In some embodiments, (A):
one of said first or second optical portion (OP1, OP2) is mainly located in the central part of the lens, and
the other optical portion (OP2, OP1) is mainly located in a peripheral, temporal, nasal, bottom or top part of the lens;

In some embodiments, (B):
one of said first or second optical portion (OP1, OP2) is mainly located in a nasal part of the lens, and
the other optical portion (OP2, OP1) is mainly located in a temporal part of the lens;

In some embodiments, (C):
one of said first or second optical portion (OP1, OP2) is mainly located in a top part of the lens, and
the other optical portion (OP2, OP1) is mainly located in a bottom part of the lens.

According to a preferred feature of the present invention:
said second optical portion (OP2) is mainly located in a central, temporal, bottom or top part of the lens when said first optical portion (OP1) is mainly located in a nasal part of the lens, and
said second optical portion (OP2) is mainly located in a temporal, bottom or top part of the lens when said first optical portion (OP1) is mainly located in a central part of the lens.

Even more preferably:
said first optical portion (OP1) is mainly located in a nasal part of the lens and said second optical portion (OP2) is mainly located in a central, temporal, bottom or top part of the lens, or
said first optical portion (OP1) is mainly located in a central part of the lens and said second optical portion (OP2) is mainly located in a temporal, bottom or top part of the lens.

In some embodiments, the parts of the lens are defined as follows in (α,β) coordinates, wherein (α,β) are expressed in degrees and wherein SQRT is the square root function:
the central part corresponds to:
the part of the lens within a cone of gaze directions such that
SQRT $(\alpha^2+\beta^2) \leq 20°$ or SQRT $(\alpha^2+\beta^2) \leq 10°$, or
the part of the lens in the primary gaze direction or the control point of the lens;
the peripheral part corresponds to:
the part of the lens that is not the central part, or
the ring part of the lens within gaze directions such that $10° \leq$ SQRT $(\alpha^2+\beta^2) \leq 40°$ or $20° \leq$ SQRT $(\alpha^2+\beta^2) \leq 40°$;
the temporal part corresponds to the gaze directions within an ellipse defined by vertices A, B, C, D, with the following coordinates:
$A(\alpha_A, \beta_A)$: $\alpha_A=0$ and $20°<\beta_A \leq 30°$;
$B(\alpha_B, \beta_B)$: $\alpha_B=0$ and $\beta_A+10° \leq \beta_B \leq \beta_A-20°$;
$C(\alpha_C, \beta_C)$: $-30° \leq \alpha_C \leq -10°$ and $\beta_C=\frac{1}{2}(\beta_A+\beta_B)$;
$D(\alpha_D, \beta_D)$: $\alpha_D=-\alpha_C$ and $\beta_D=\beta_C$;
the nasal part corresponds to the gaze directions within an ellipse defined by vertices A', B', C', D', with the following coordinates:
$A'(\alpha_{A'}, \beta_{A'})$: $\alpha_{A'}=0$ and $-30°<\beta_{A'} \leq -20°$;
$B'(\alpha_{B'}, \beta_{B'})$: $\alpha_{B'}=0$ and $\beta_{A'}-20° \leq \beta_{B'} \leq \beta_{A'}-10°$;
$C'(\alpha_{C'}, \beta_{C'})$: $-30° \leq \alpha_{C'} \leq -10°$ and $\beta_{C'}=\frac{1}{2}(\beta_{A'}+\beta_{B'})$;
$D'(\alpha_{D'}, \beta_{D'})$: $\alpha_{D'}=-\alpha_{C'}$ and $\beta_{D'}=\beta_{C'}$;
the top part corresponds to the gaze directions within an ellipse defined by vertices A", B", C", D", with the following coordinates:

A"($\alpha_{A''}$, $\beta_{A''}$): $-30° \leq \alpha_{A''} \leq -20°$ and $\beta_{A''}=0$;
B"($\alpha_{B''}$, $\beta_{B''}$): $\alpha_{A''}-20° \leq \alpha_{B''} \leq \alpha_{A''}-10°$ and $\beta_{B''}=0$;
C"($\alpha_{C''}$, $\beta_{C''}$): $\alpha_{C''}=\frac{1}{2}(\alpha_{A''}+A_{B''})$ and $-30° \leq \beta_{C''} \leq -10°$;
D"($\alpha_{D''}$, $\beta_{D''}$): $\alpha_{D''}=\alpha_{C''}$ and $\beta_{D''}=-\beta_{C''}$;

the bottom part corresponds to the gaze directions within an ellipse defined by vertices A''', B''', D''', with the following coordinates:

A'''($\alpha_{A'''}$, $\beta_{A'''}$): $20° \leq \alpha_{A'''} \leq 30°$ and $\beta_{A'''}=0$;
B'''($\alpha_{B'''}$, $\beta_{B'''}$): $\alpha_{A'''}+10° \leq \alpha_{B'''} \leq \alpha_{A'''}+20°$ and $\beta_{B'''}=0$;
C'''($\alpha_{C'''}$, $\beta_{C'''}$): $\alpha_{C'''}=\frac{1}{2}(\alpha_{A'''}+\alpha_{B'''})$ and $-30° \leq \beta_{C'''} \leq -10°$;
D'''($\alpha_{D'''}$, $\beta_{D'''}$): $\alpha_{D'''}=\alpha_{C'''}$ and $\beta_{D'''}=-\beta_{C'''}$.

Figure 4:
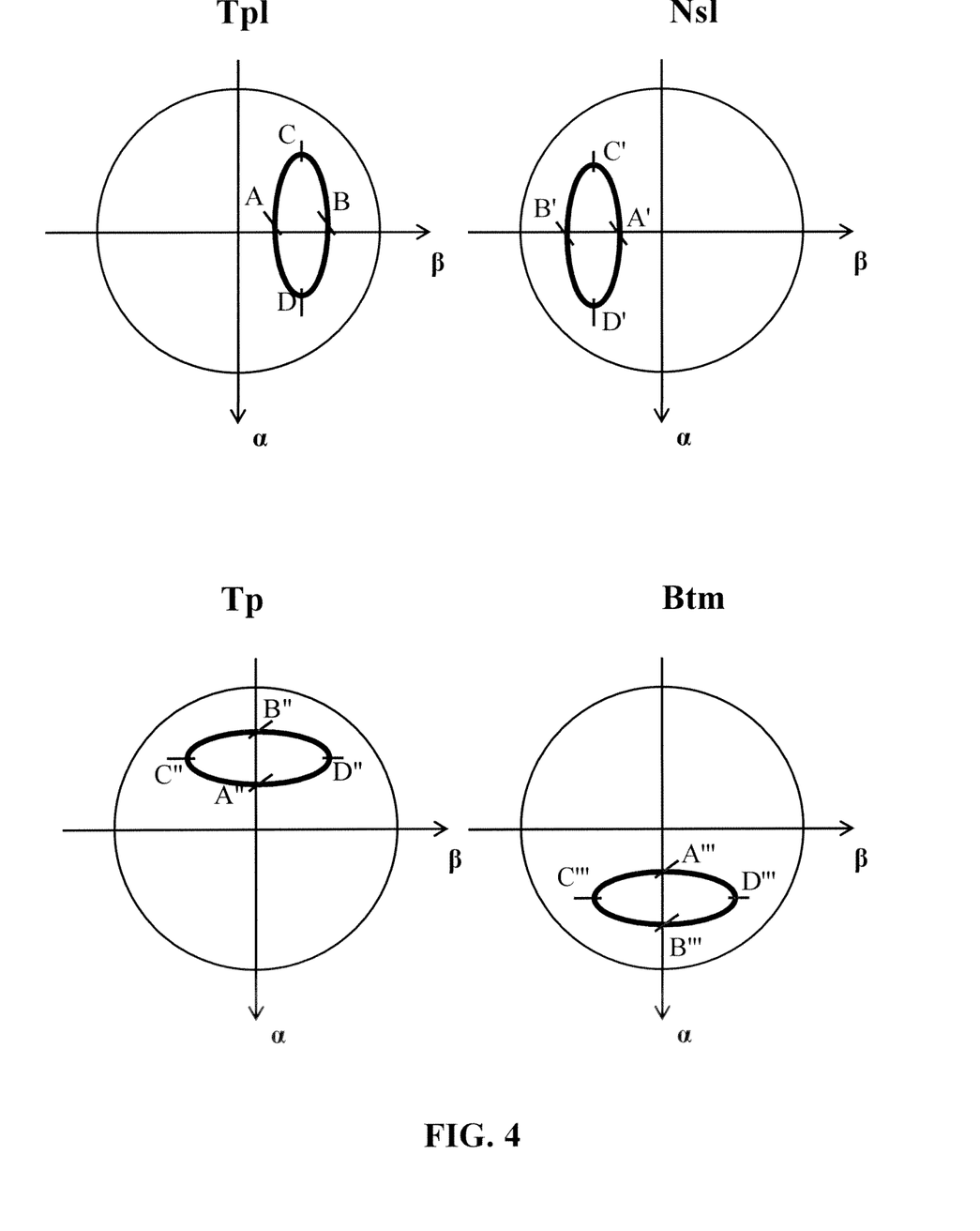
FIG. 4 show temporal part, nasal part, top part and bottom part of the lens according to the invention.

Illustrations of temporal part (Tpl), nasal part (Nsl), top part (Tp) and bottom part (Btm) are provided on FIG. 4.

In some embodiments, the optical power varies continuously over the whole lens.

In some embodiments:
said ophthalmic lens is a single vision lens, or
said ophthalmic lens has a single control point, or
said ophthalmic lens is such that it is intended for a wearer for which no addition (or nil addition) is prescribed or required.

The present invention also relates to a semi-finished ophthalmic lens, wherein the finished surface of said semi-finished lens is identical to the object-side surface (FS) of an ophthalmic lens as described herein.

The present invention also relates to a method for the manufacture of an ophthalmic lens, comprising
a step of machining an ophthalmic lens as described herein, and/or
a step of providing a semi-finished ophthalmic lens as described herein.

The ophthalmic lens is intended for a non-presbyopic wearer. The lens is for correcting ametropia: it corresponds to a desired value of optical power and/or a desired value of astigmatism. Said desired values may derive from a prescription or any type of assessment, e.g. assessment performed by an eye care specialist. Said ophthalmic lens may be a prescription lens or a non-prescription lens such as over the counter reading glasses (ready-made glasses, 'readers', non-prescription glasses or generic readers).

The ophthalmic lens comprises a front surface (object-side surface, FS) and a rear surface (eye-side surface, RS). In some embodiments, the object side surface (FS) of the lens is aspherical (not spherical) or not rotationally symmetrical (not axially symmetrical). In some embodiments, the eye-side surface (RS) of the lens is not rotationally symmetrical (not axially symmetrical).

In some embodiments, the ophthalmic lens may be:
a single-vision lens within the meaning of ISO standard 13666:2012, and/or configured for providing a desired single optical power value (dioptric power as defined in ISO standard 13666:2012, and/or
such that it comprises a single control point at which the desired optical power is determined; the control point may be as defined in ISO standard 8980-1:2004 for Uncut finished spectacle lenses and ISO standard 21987:2009 for mounted spectacle lenses, and/or
a lens for which no addition value is prescribed (Add=0.00).

The ophthalmic lens of the invention may be cut or uncut.

The ophthalmic lens of the invention may be a semi-finished lens blank, a finished lens (cut or uncut).

The manufacturing method of the invention may comprise one or more machining steps, such as one or more surfacing steps. In particular, the method of the invention may comprise a step of surfacing the front surface of the lens and/or a step of surfacing the rear surface of the lens.

The invention is illustrated by the following non-limiting examples.

EXAMPLES

Example 1

Single-Vision Lens (Prescription Values: +6 B7.25)

A reference single-vision ophthalmic lens (+6 B7.25) is made aspherical.

The optical optimization for this lens generates an optical power defect $\Delta P$ between the center (0°) and the rim (periphery) (−30°) of the lens. As a consequence, magnification (G, enlargement) differs between the center and the rim of the lens (G0°, G30°).

In order to reduce the variation of G between the center and the rim, the present invention proposes to flatten or arch the lens at the rim as a function of the sign of the optical power defect.

Reference Lens (Prior Art; Ref L)

The lens is as follows (object-side surface FS is spherical)

| B7.25 | P0° = +6     | G0° = 1.403006  |
| B7.25 | P30° = +6.22 | G30° = 1.421318 |

Thus, between the center and the rim, the variations (differences) are as follows:
$\Delta P=0.22$, and $\Delta G=0.018312$ Lens of the Invention (L)
Base 0°: 7.25 Base 30°: 4.00

According to the invention, in order to reduce distortion, the front surface is flattened where the optical power is higher, presently at 30°. The rear surface is then optimized so as to retain the same optical power and astigmatism (or resulting astigmatism) values over the lens.

Thus, with base of 7.25 at the center, and base of 4.00 at the rim (periphery):

| B7.25 | P0° = +6     | G0° = 1.403006  |
| B4.00 | P30° = +6.22 | G30° = 1.412806 |

In that case, between the center and the rim, there is still $\Delta P=0.22$, but advantageously according to the invention, $\Delta G=0.0097$. The comparison is shown on FIG. 5.

The lens of the invention may have various surfaces, as shown on FIGS. 6-9:
Surface S1 (concentric; axially symmetrical): Base 0°: 7.25; Base 30°: 4.00; as shown on FIGS. 6 and 7;
Surface S2 (not concentric; not axially symmetrical): Base 0°: 7.25; Base 30°: 4.00; as shown on FIGS. 8 and 9.

Example 2

Single-Vision Lens (Prescription Values: +6 B7.25)

A reference single-vision ophthalmic lens (+6 B7.25) is made aspherical.

The optical optimization for this lens generates an optical power defect $\Delta P$ between the center (0°) and the rim (periphery) (−30°) of the lens. As a consequence, magnification (G, enlargement) differs between the center and the rim of the lens (G0°, G30°).

In order to reduce the variation of G between the center and the rim, the present invention proposes to flatten or arch the lens at the rim as a function of the sign of the optical power defect.

Reference Lens (Prior Art; Ref L)

The reference lens is as in example 1.

Thus, between the center and the rim, the variations (differences) are as follows:

ΔP=0.22, and ΔG=0.018312

Lens of the Invention (L)

Base 0°: 8.00 Base 30°: 7.25

According to the invention, in order to reduce distortion, the front surface is flattened where the optical power is higher, presently at 30°. The rear surface is then optimized so as to retain the same optical power and astigmatism (or resulting astigmatism) values over the lens.

Thus, with base of 8.00 at the center, and base of 7.25 at the rim (periphery):

| | | |
|---|---|---|
| B8.00 | P0° = +6 | G0° = 1.404985837 |
| B7.25 | P30° = +6.22 | G30° = 1.421318 |

In that case, between the center and the rim, there is still ΔP=0.22, but advantageously according to the invention, ΔG=0.01633. The comparison is shown on FIG. 10.

The lens of the invention may have various surfaces, as shown on FIGS. 11-14

Surface S3 (concentric; axially symmetrical): Base 0°: 8.00; Base 30°: 7.25; as shown on FIGS. 11 and 12;

Surface S4 (not concentric; not axially symmetrical): Base 0°: 8.00; Base 30°: 7.25; as shown on FIGS. 13 and 14.

Figure 5:
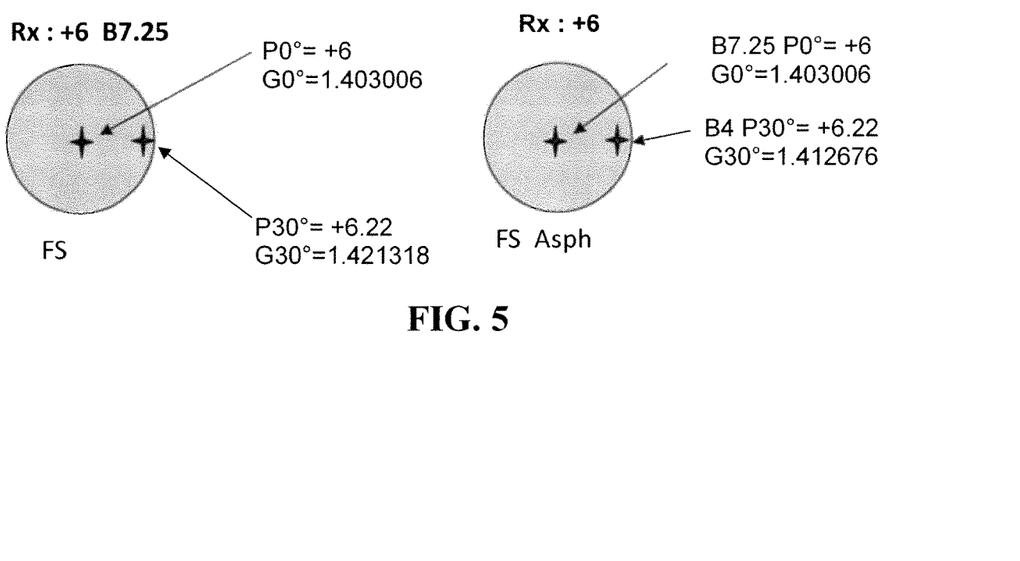
FIGS. 5-9 illustrate example 1.
Figure 6:
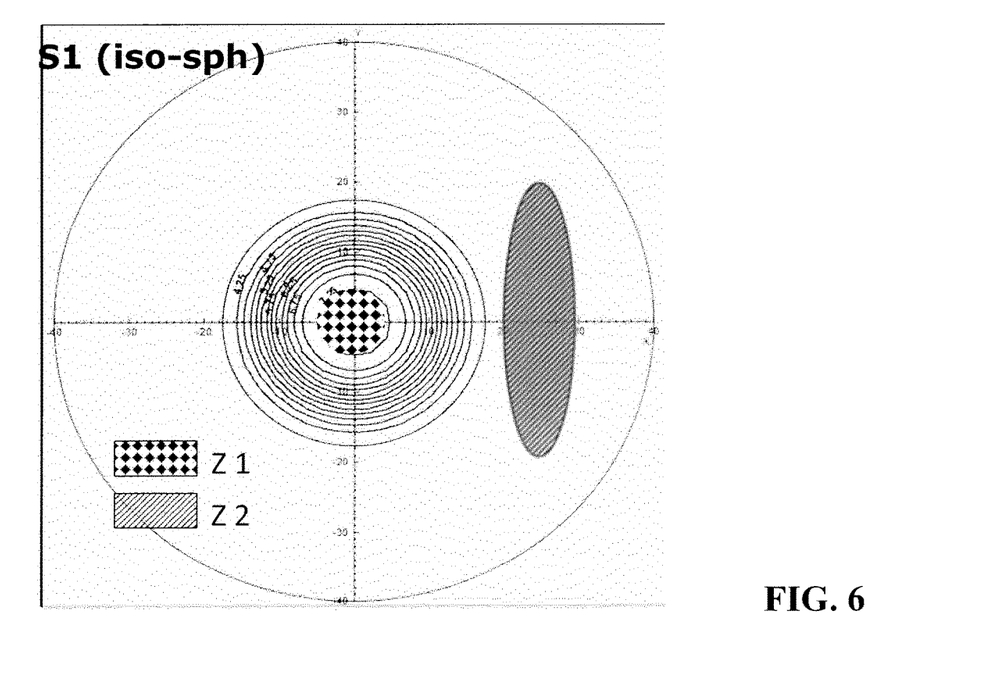
Figure 7:
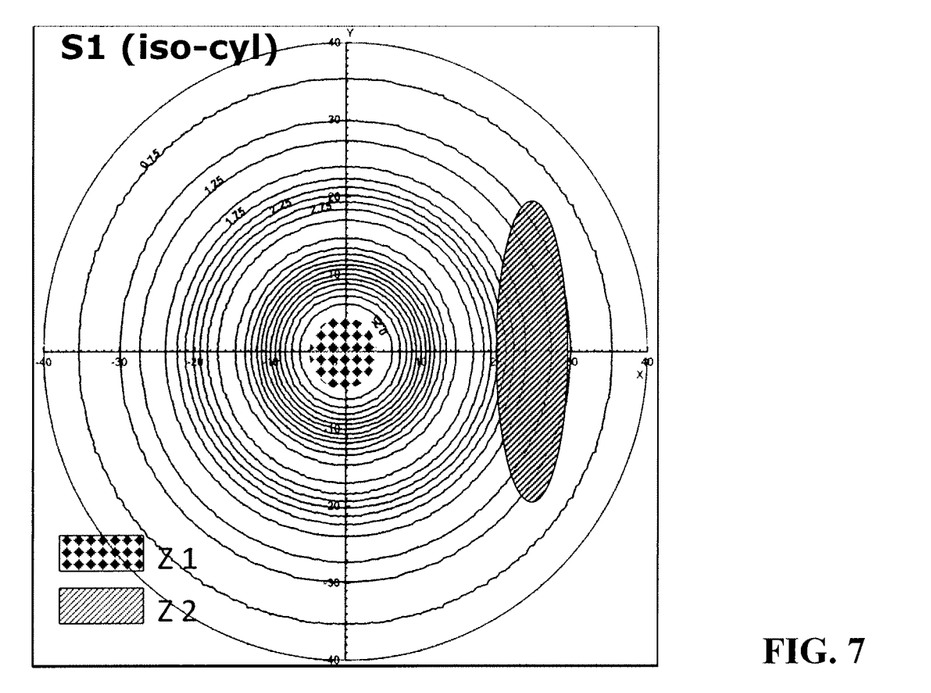
Figure 8:
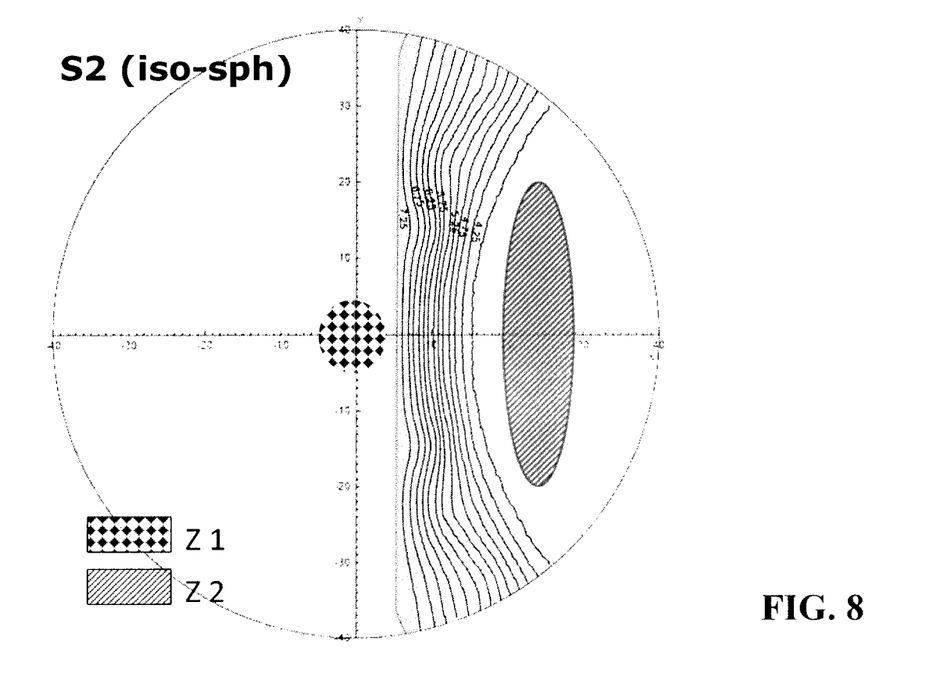
Figure 9:
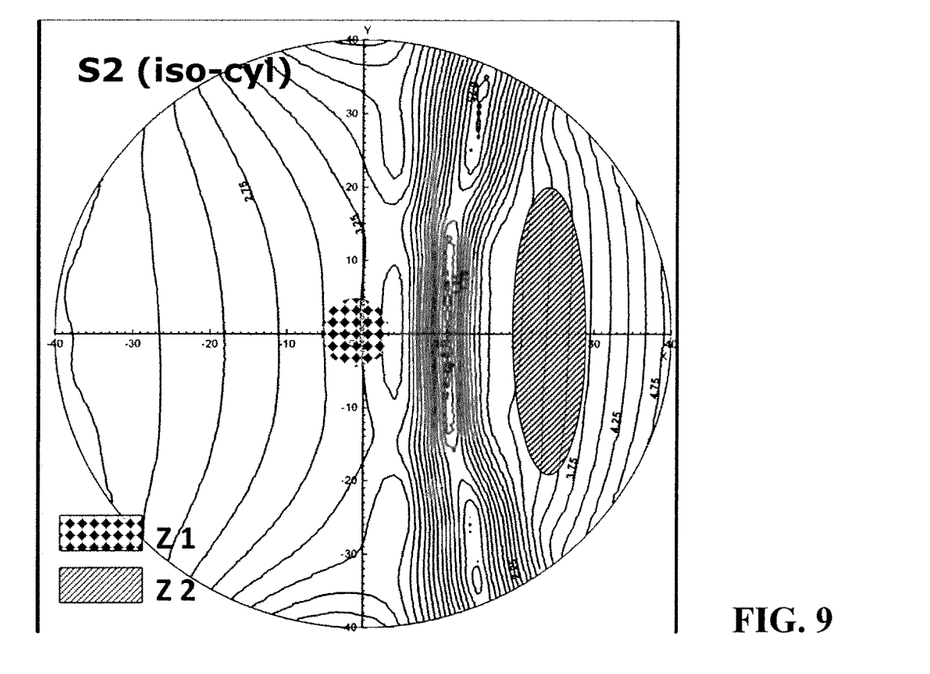
Figure 10:
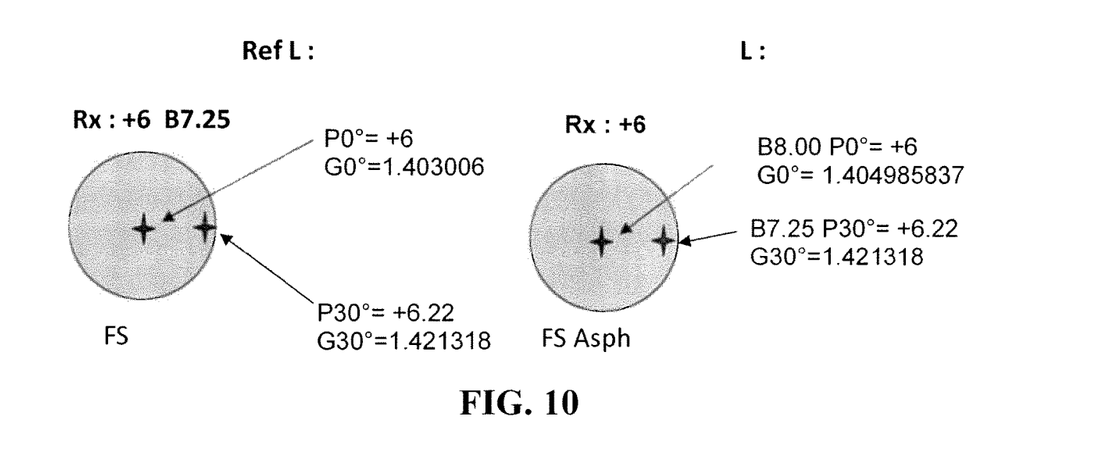
FIGS. 10-14 illustrate example 2.
Figure 11:
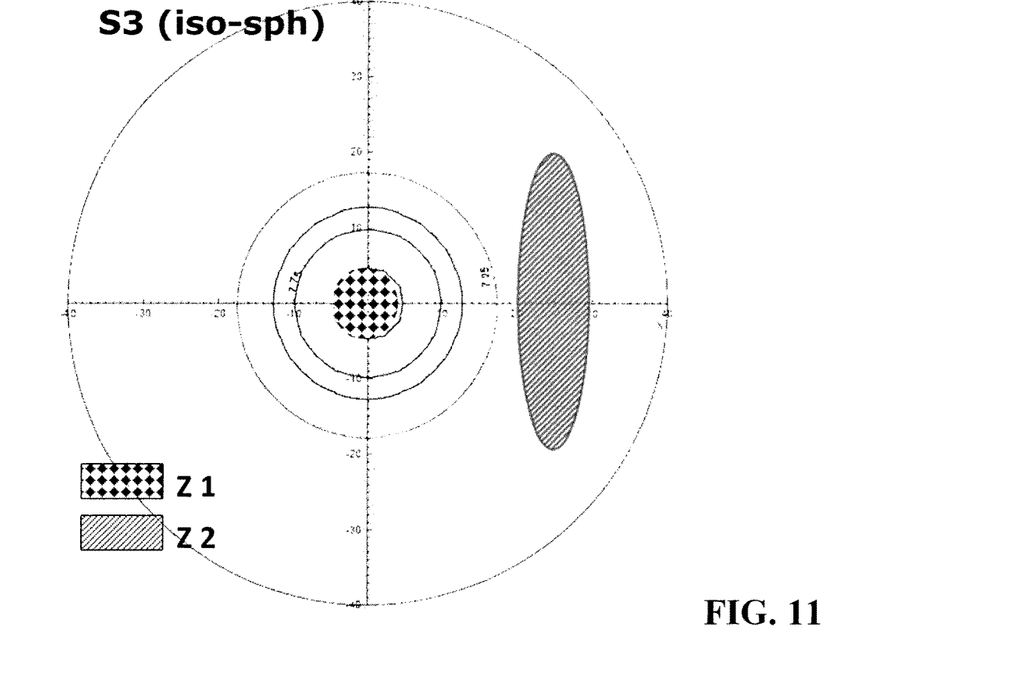
Figure 12:
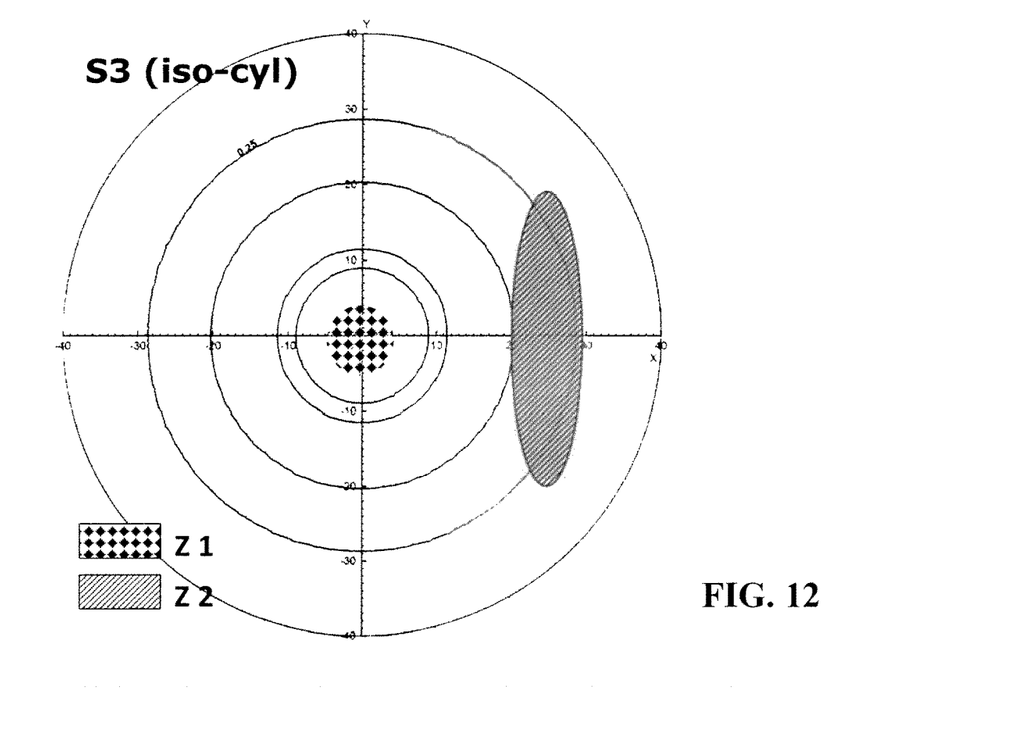
Figure 13:
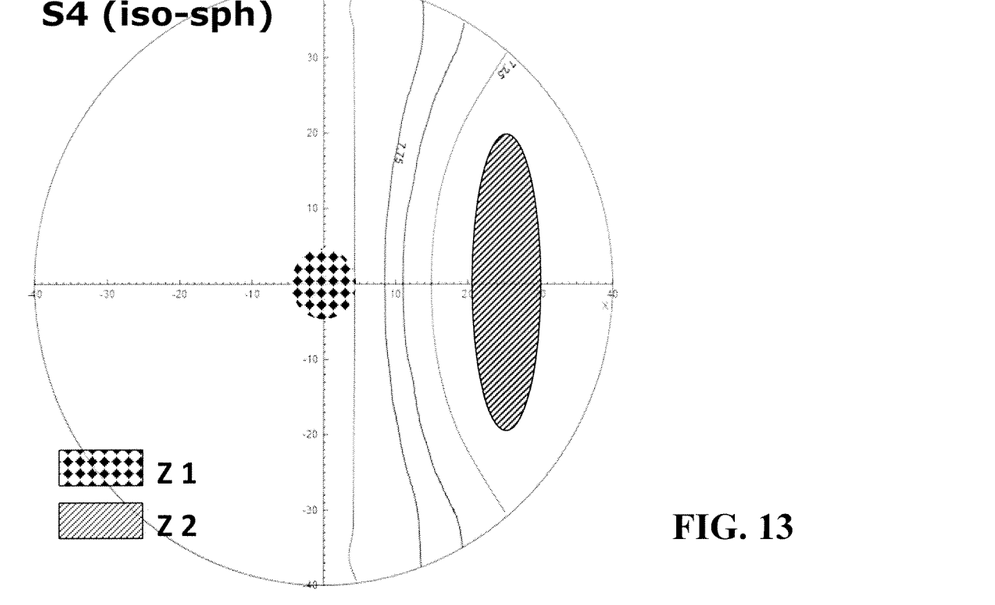
Figure 14:
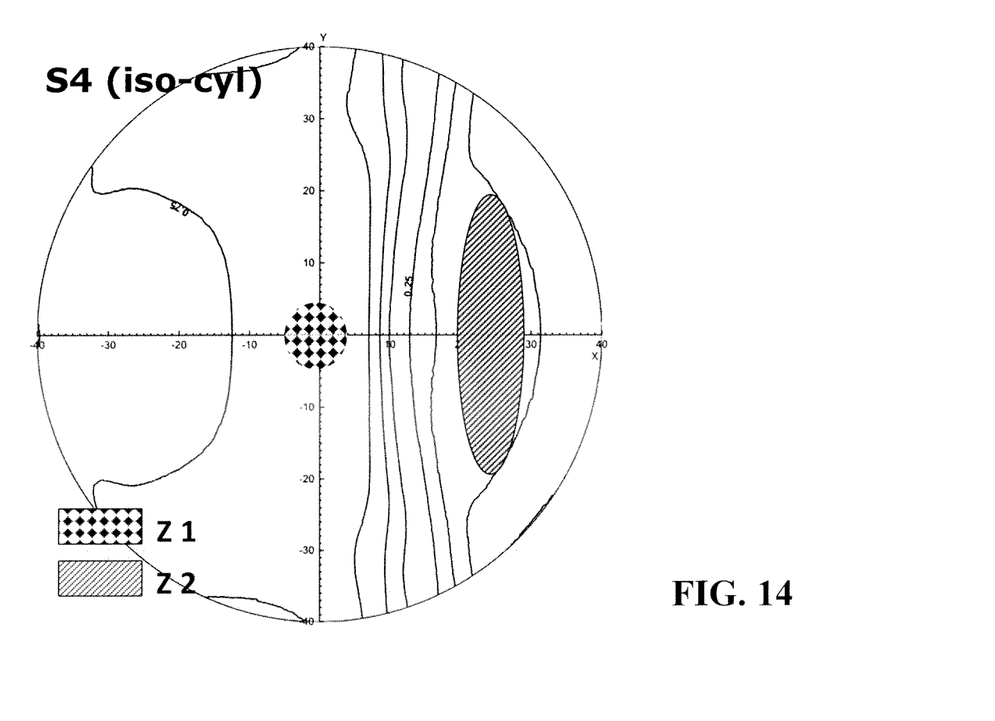

Legend to FIGS. 5 and 10: Rx: prescription; B: base; FS: front surface; Sph: spherical; Asph: aspherical; P: optical power; G; magnification, enlargement. On the left side: Ref L=reference lens. On the right side: L=lens of the invention.

Legend to FIGS. 6-9 and 11-14: S: surface; iso-sph: iso-sphere map; iso-cyl: iso-cylinder map; Z: zone.

As a conclusion from example 1 and example 2:

| Lens | Base 0° | Base 30° | P 0° | P 30° | G 0° | G 30° | ΔG |
|---|---|---|---|---|---|---|---|
| Ref lens (prior art) | 7.25 | 7.25 | 6 | 6.22 | 1.403006 | 1.421318 | 0.018312 |
| Ex 1 (inv) | 7.25 | 4.00 | 6 | 6.22 | 1.403006 | 1.412806 | 0.00967 |
| Ex 2 (inv) | 8.00 | 7.25 | 6 | 6.22 | 1.404986 | 1.421318 | 0.01633 |

The invention claimed is:

1. An ophthalmic lens configured to correct a wearer's eye vision in compliance with a desired value of optical power and/or a desired value of astigmatism, wherein the wearer's eye is non presbyopic, wherein the ophthalmic lens comprises:

an eye-side surface positioned closest to the wearer's eye when the ophthalmic lens is worn by the wearer in given wearing conditions;

an object-side surface positioned opposite to the eye-side surface in the wearing conditions;

a first optical portion through the lens defined by both the eye-side surface and the object-side surface having in the wearing conditions a first optical power P1;

a second optical portion through the lens defined by both the eye-side surface and the object-side surface having in the wearing conditions a second optical power P2;

a first zone on the object-side surface, the first zone corresponding in the wearing conditions to the object-side surface portion of the first optical portion, the first zone having a mean curvature value MCURV1;

a second zone on the object-side surface, the second zone corresponding in the wearing conditions to the object-side surface portion of the second optical portion, the second zone having a mean curvature value MCURV2;

wherein P1<P2 and MCURV2<MCURV1, and wherein the second optical portion is mainly located in a central, temporal, bottom or top part of the lens and the first optical portion is mainly located in a nasal part of the lens, or, in the alternative, the second optical portion is mainly located in a temporal, bottom or top part of the lens and the first optical portion is mainly located in a central part of the lens, wherein the ophthalmic lens provides at least a first effective portion of stabilized optical power wherein the value of optical power does not deviate by more than +/−0.120 diopters from the value of desired optical power, and wherein the first effective portion corresponds in the wearing conditions to a first area of the object-side surface, wherein the first area comprises a disk of at least a 6 mm diameter.

2. An ophthalmic lens according to claim 1, wherein the object side surface of the lens is aspherical.

3. An ophthalmic lens according to claim 1, wherein the object side surface of the lens is not rotationally symmetrical.

4. An ophthalmic lens according to claim 1, wherein the eye-side surface is not rotationally symmetrical.

5. An ophthalmic lens according to claim 1, wherein the parts of the lens are defined as follows in $(\alpha,\beta)$ coordinates, wherein $(\alpha,\beta)$ are expressed in degrees and wherein SQRT is the square root function:

the central part corresponds to:

the part of the lens within a cone of gaze directions such that $SQRT(\alpha^2+\beta^2) \leq 20°$ or $SQRT(\alpha^2+\beta^2) \leq 10°$, or the part of the lens in the primary gaze direction or the control point of the lens;

the temporal part corresponds to the gaze directions within an ellipse defined by vertices A, B, C, D, with the following coordinates:

$A(\alpha_A, \beta_A)$: $\alpha_A=0$ and $20° \leq \beta_A \leq 30°$;

$B(\alpha_B, \beta_B)$: $\alpha_B=0$ and $\beta_A+10° \leq \beta_B \leq \beta_A+20°$, $C(\alpha_C, \beta_C)$: $-30° \leq \alpha_C \leq -10°$ and $\beta_C=\frac{1}{2}(\beta_A+\beta_B)$;

$D(\alpha_D, \beta_D)$: $\alpha_D=-\alpha_C$ and $\beta_D=\beta_C$;

the nasal part corresponds to the gaze directions within an ellipse defined by vertices A', B', C', D', with the following coordinates:

$A'(\alpha_{A'}, \beta_{A'})$: $\alpha_{A'}=0$ and $-30° \leq \beta_{A'} \leq -20°$;

$B'(\alpha_{B'}, \beta_{B'})$: $\alpha_{B'}=0$ and $\beta_{A'}-20° \leq \beta_{B'} \geq \beta_{A'}-10°$;

$C'(\alpha_{C'}, \beta_{C'})$: $-30° \leq \alpha_{C'} \leq -10°$ and $\beta_{C'}=\frac{1}{2}(B_{A'}+\beta_{B'})$;

$D'(\alpha_{D'}, \beta_{D'})$: $\alpha_{D'}=-\alpha_{C'}$ and $\beta_{D'}=\beta_{C'}$;

the top part corresponds to the gaze directions within an ellipse defined by vertices A'', B'', C'', D'', with the following coordinates:

$A''(\alpha_{A''}, \beta_{A''})$: $-30° \leq \alpha_{A''} \leq -20°$ and $\beta_{A''}=0$;

$B''(\alpha_{B''}, \beta_{B''})$: $\alpha_{A''}-20° \leq \alpha_{B''} \leq \alpha_{A''}-10°$ and $\beta_{B''}=0$;

$C''(\alpha_{C''}, \beta_{C''})$: $\alpha_{C''}=\frac{1}{2}(\alpha_{A''}+\alpha_{B''})$ and $-30° \leq \beta_{C''} \leq -10°$;

$D''(\alpha_{D''}, \beta_{D''})$: $\alpha_{D''}=\alpha_{C''}$ and $\beta_{D''}=\beta_{C''}$;

the bottom part corresponds to the gaze directions within an ellipse defined by vertices A''', B''', C''', D''', with the following coordinates:

A'''($\alpha_{A'''}$, $\beta_{A'''}$): $20° \leq \alpha_{A'''} \leq 30°$ and $\beta_{A'''}=0$;
B'''($\alpha_{B'''}$, $\beta_{B'''}$): $\alpha_{A\alpha'''}+10° \leq \alpha_{B'''} \leq \alpha_{A'''}+20°$ and $\beta_{B'''}=0$;
C'''($\alpha_{C'''}$, $\beta_{C'''}$): $\alpha_{C'''}=\frac{1}{2}(\alpha_{A'''}+\alpha_{B'''})$ and $-30° \leq \beta_{C'''} \leq -10°$;
D'''($\alpha_{D'''}$, $\beta_{D'''}$): $\alpha_{D'''}=\alpha_{C'''}$ and $\beta_{D'''}=\beta_{C'''}$.

6. An ophthalmic lens according to claim 1, wherein
the ophthalmic lens is a single vision lens, or
the ophthalmic lens has a single control point, or
the ophthalmic lens is intended for a wearer for which no addition or nil addition is prescribed or required.

7. An ophthalmic lens according to claim 1, wherein the ophthalmic lens is a semi-finished ophthalmic lens.

8. A method for the manufacture of an ophthalmic lens, comprising
machining an ophthalmic lens according to claim 1; and
providing a semi-finished ophthalmic lens.

* * * * *